Oct. 29, 1968
L. RAY
3,407,824
TANK WASHER
Filed Oct. 28, 1966
3 Sheets-Sheet 1
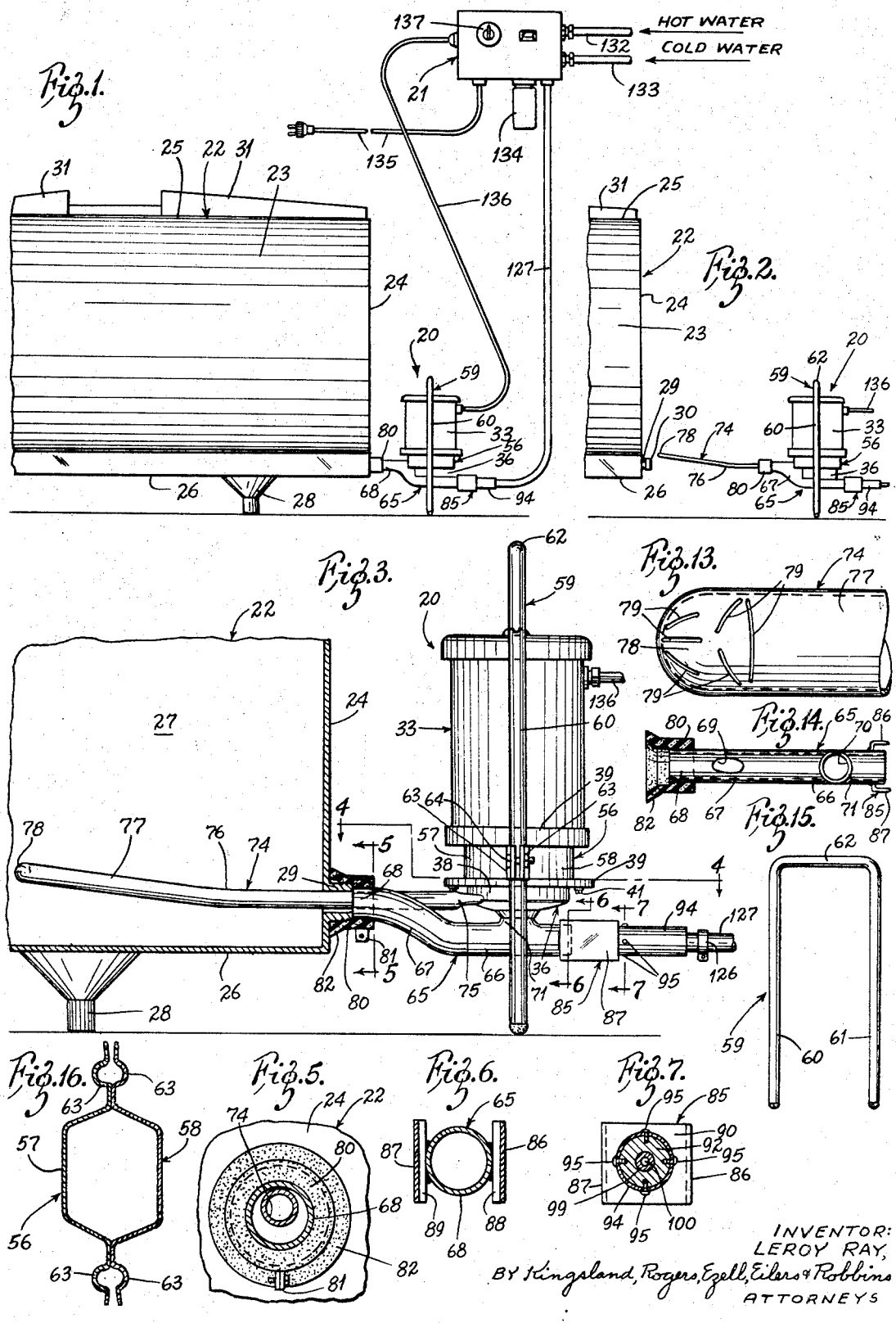
INVENTOR:
LEROY RAY,
BY Kingsland, Rogers, Ezell, Eilers & Robbins
ATTORNEYS

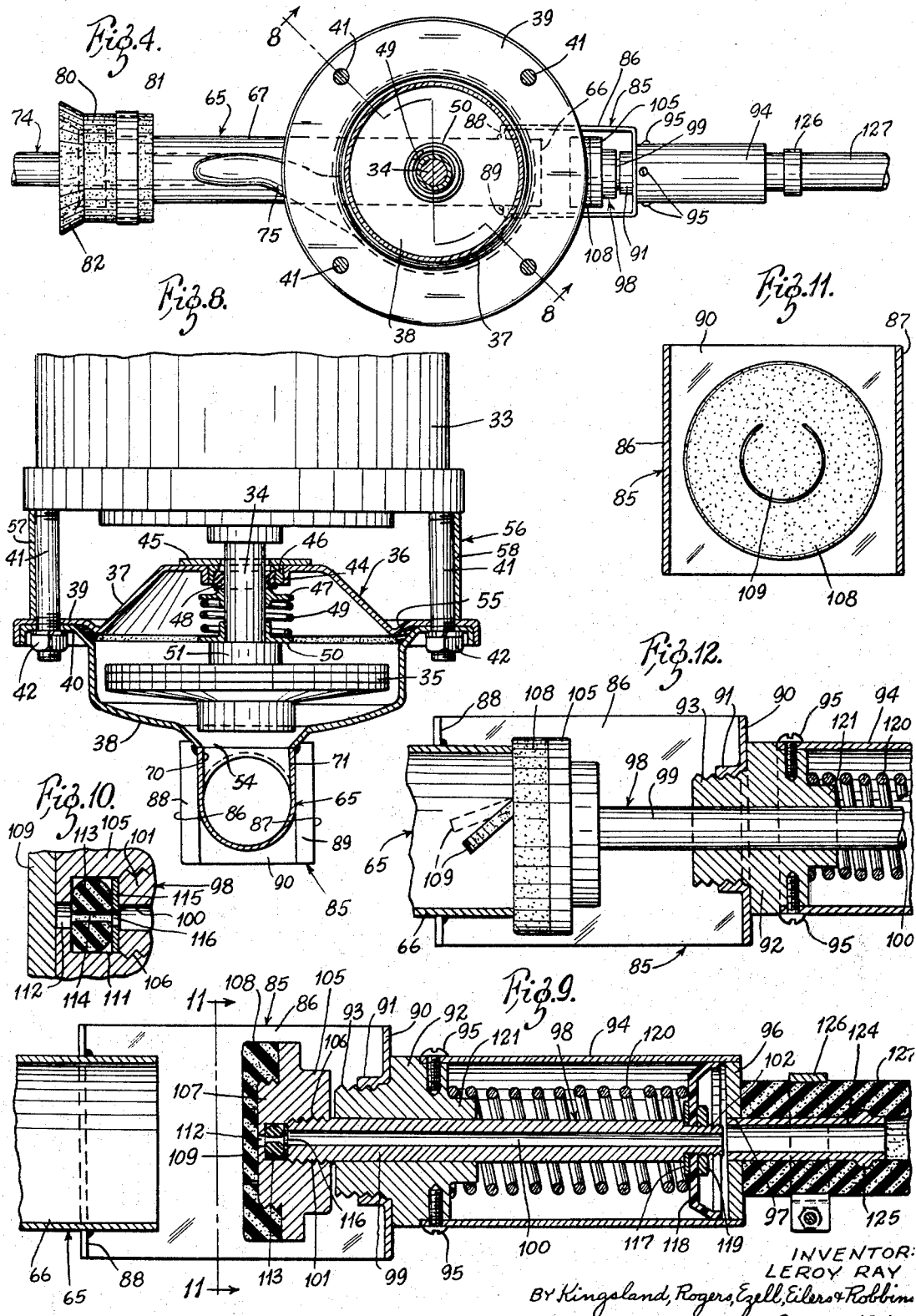

Oct. 29, 1968   L. RAY   3,407,824
TANK WASHER
Filed Oct. 28, 1966   3 Sheets-Sheet 3
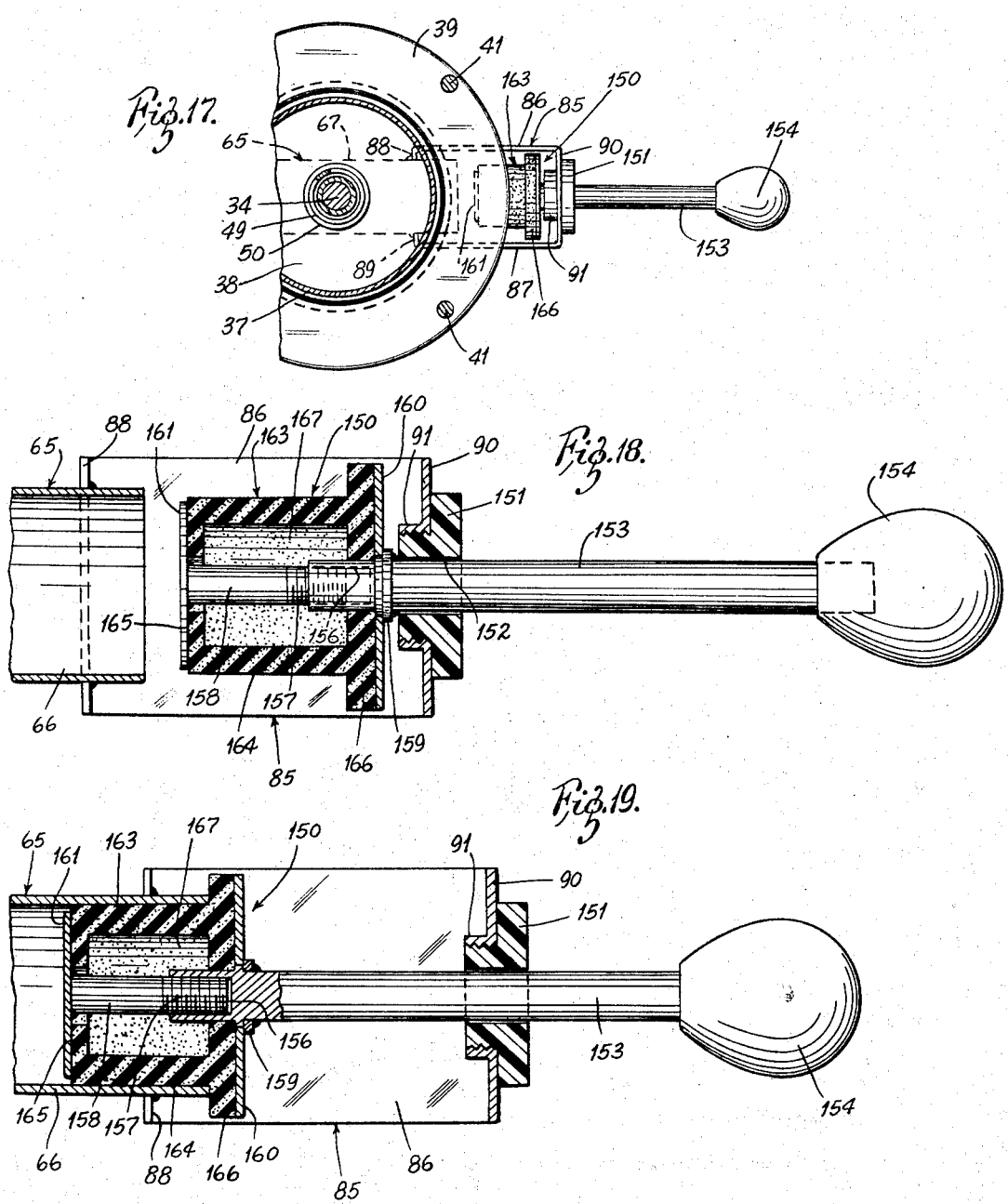
INVENTOR:
LEROY RAY,
BY Kingsland, Rogers, Ezell, Eilers & Robbins
ATTORNEYS

United States Patent Office 3,407,824
Patented Oct. 29, 1968

3,407,824
TANK WASHER
Leroy Ray, Springfield, Mo., assignor to Paul Mueller
Company, Springfield, Mo., a corporation of Missouri
Filed Oct. 28, 1966, Ser. No. 590,436
9 Claims. (Cl. 134—56)

This invention relates to a tank washer and particularly to a washer for automatically cleaning a tank, such as a milk tank.

The principal object of the invention is to provide a tank washer that is connectable to the drain outlet fitting of a tank to automatically and thoroughly wash the tank interior within a short period of time, utilizing a minimum amount of water and cleaning compound.

In general, in one embodiment of this invention, the tank washer comprises a suction pipe with a rubber adaptor for connecting the suction pipe directly to the drain fitting of the tank. A water supply hose leading from a washer control is connected to the suction pipe by way of a drain valve. When the washer control admits water to the supply hose, a valve member performs the dual functions of automatically connecting the supply hose to the suction pipe for conveying water to partially fill the tank while blocking the suction pipe to prevent water from draining from the tank. When the washer control interrupts the delivery of water to the supply hose, the valve member responds to unblock the suction pipe to permit water to drain from the tank. A jet spray tube extends through the suction pipe and into the tank and has its inlet connected to the outlet of a rotary impeller. The inlet to the impeller communicates with the suction pipe. When the impeller operates between the foregoing filling and draining cycles with the suction pipe blocked by the valve member, water is circulated from the tank through the suction pipe and past the impeller to the jet spray tube to be sprayed to all interior surfaces of the tank. The arrangement of these parts is such that they can be automatically controlled for operation of the washer through any desired stages including the stages of partially filling the tank with water, circulating the water through the jet spray tube, and thereafter draining the tank. Objects of the invention are to provide a tank washer having the foregoing characteristics and advantages. Particular objects are to provide a tank washer having a value member which performs the dual functions described automatically in response to the flow of water or water and detergent through the supply hose.

Another object of the invention is to provide a tank washer having a suction pipe adapted to be connected to an external water supply for alternately delivering supply water to the tank and draining the water from the tank, with a jet spray tube adapted to be positioned within the tank, and with an impeller connected between the suction pipe and the jet spray tube to circulate water from the tank through the suction pipe and the impeller and back through the jet spray nozzle to provide pressure cleaning of the tank.

Another object of the invention is to provide a tank washer as described wherein the change in cycles is accomplished by a movable valve member that moves in response to changing pressure conditions according to whether or not water is being supplied from the external source.

In another embodiment of the invention, the tank washer is provided with a manually operable valve in place of the automatic valve. The manually operable valve can be closed for operation of the pump to circulate either clear or detergent water through the suction pipe and jet spray tube for spraying against the inner walls of the tank. Then, the valve can be opened to drain the tank through its drain outlet and the suction pipe. When the manually operable valve is used, the tank is partially filled with clear or detergent and water through its regular top openings.

An object of this invention is to provide a tank washer that operates through the drain opening of a tank to circulate wash and rinse water and to drain the wash or rinse water from the tank, with a manually operable valve for quickly and positively blocking and unblocking the drain opening.

Other objects of the invention are to provide a tank washer that operates efficiently and effectively through the drain fitting of a tank to clean all the interior surfaces of the tank and which operates rapidly and automatically.

Another object of the invention is to provide a washer for a tank that is easy to connect to the tank for washing the tank, and easy to disconnect after the tank is cleaned.

Other objects and advantages will be apparent to those skilled in the art.

In the drawings:

FIGURE 1 is a side elevation view of the tank washing apparatus as mounted within the drain opening of the tank, and showing the washer control for the washer;

FIGURE 2 is a side elevation view of the tank washing apparatus removed from the tank;

FIGURE 3 is an enlarged side elevation view of the tank washing apparatus with a fragmentary corner portion of a tank shown in section, and with the jet spray tube of the washer mounted in the drain opening of the tank;

FIGURE 4 is an enlarged view in section taken along the line 4—4 of FIGURE 3, but with the leg standard removed;

FIGURE 5 is an enlarged fragmentary view in section taken along the line 5—5 of FIGURE 3;

FIGURE 6 is an enlarged view in section taken along the line 6—6 of FIGURE 3;

FIGURE 7 is an enlarged view in section taken along the line 7—7 of FIGURE 3;

FIGURE 8 is an enlarged view in section taken along the line 8—8 of FIGURE 4;

FIGURE 9 is an enlarged fragmentary view in longitudinal medial section through the drain valve assembly, showing the valve in opening position;

FIGURE 10 is a further enlarged fragmentary view in longitudinal meidal section through the flow orifice portion of the drain valve assembly;

FIGURE 11 is a view in section taken along the line 11—11 of FIGURE 9;

FIGURE 12 is a fragmentary view in longitudinal medial section through a portion of the drain valve assembly, showing the valve in closed position;

FIGURE 13 is a fragmentary top plan view of the outlet or nozzle end of the jet spray tube;

FIGURE 14 is a fragmentary top plan view of the forward portion of the drain or suction tube with the jet tube and jet tube pipe removed and with the rubber outlet ferrule shown in section;

FIGURE 15 is a front elevation view on a reduced scale of the leg standard;

FIGURE 16 is a plan view in longitudinal medial section through the leg retainer and spacer assembly;

FIGURE 17 is a fragmentary view in section, similar to that of FIGURE 4, but showing a manually operable valve in another embodiment of the invention;

FIGURE 18 is an enlarged fragmentary view similar to FIGURE 9, showing the valve in open position; and FIGURE 19 is a view similar to FIGURE 18 but showing the valve in closed position.

Referring now to the drawings, this invention includes a washer 20 which is operated by an automatic washer control 21 to clean a tank 22, such as a milk tank. Milk tanks, and other tanks, are subjected to rigid sanitation standards, and this washer 20 is designed to effectively clean all the interior surfaces of the tank 22.

In general, the tank 22 includes side walls 23, end walls 24, a top wall 25, and a bottom wall 26, all defining an enclosure 27. The tank also has legs 28 and a drain outlet fitting 29 that is normally closed by a cover 30 threaded onto the plug 29. There are usually one or more access covers 31 in the top of the tank. The tank 22 may range in size from tens of gallons to thousands of gallons capacities.

The washer 20 includes a pump housing 33 that houses a pump motor of any conventional design (not shown). An output shaft 34 driven by the motor projects downwardly from the motor housing 33, and an impeller 35 is connected to the lower end of the shaft 34.

An impeller housing 36 surrounds the impeller 35. The impeller housing 36 comprises upper and lower halves 37 and 38 having outer annular flanges 39 and 40 by which the housing valves 37 and 38 are connected together. The flanges 39 and 40 are mounted on a plurality of bolts 41 that project downwardly from the motor housing 33 and are held in place by nuts 42 threaded onto the bolts 41.

The upper housing half 37 has a downwardly flanged opening 44 through its center through which the shaft 34 extends. A plate 45 surrounds the shaft 34 and is welded to the upper surface of the impeller housing 36. A liquid seal surrounding the shaft 34 consists of a retainer 46 and two sealing collars 47 and 48 that are held together by a spring 49 bearing against a collar 50. The collar 50 rests against a hub 51 in the impeller 35. The spring 49 presses the collars 47 and 48 against the retainer 46, which in turn is pressed against the plate 45.

The lower housing half 38 of the impeller housing 36 has an opening 54 through its center. Also, there is an annular gasket 55 between the upper and lower impeller housing halves 37 and 38.

A leg retainer and spacer assembly 56 is clamped by the bolts 41 between the motor housing 33 and the impeller housing 36. The spacer and leg retainer 56 is shown in FIGURE 16 as comprising two sections 57 and 58, both of which are formed of strip metal bent to the shapes shown.

A leg standard 59 is shown in FIGURE 15. The leg standard comprises a metal tube bent to form a pair of legs 60 and 61 connected at their upper ends by a crossbar 62. The legs 60 and 61 are clamped between opposing loops 63 on the sections 57 and 58 of the leg retainer and spacer assembly 56 and are held in place by bolts 64 with the legs 60 and 61 projecting vertically downwardly, and the crossbar 62 positioned above the motor housing 33 to act as a handle.

As FIGURES 3 and 14 show, the washer 20 includes a suction pipe 65 having a straight rearward portion 66 and an upwardly curved forward portion 67 terminating in a straight forward end 68. The pipe 65 is hollow and has two openings 69 and 70 through its top, as shown in FIGURE 14. The opening 69 is oval-shaped and the opening 70 is round and is surrounded by a short pipe extension 71. The pipe extension 71 is welded to the lower half 38 of the impeller enclosure 36 to provide liquid communication between the suction pipe 65 and the impeller 35.

A metal jet tube 74 extends through the front section 68 of the suction pipe 65 and through the oval opening 69. The jet tube 74 is welded to the suction pipe 65 around the opening 69 to provide a watertight seal. Also, the rearward end 75 of the jet tube 74 communicates with the interior of the impeller housing 36 through an opening (not shown) and is welded to the lower section 38 of the impeller housing 36 to provide a liquid tight seal. There is a bend 76 near the center of the jet tube 74 to extend its forward section 77 upwardly. The forward end 78 of the jet tube 74 has a plurality of slots 79 through it sized and positioned according to the desired spray pattern for the washer.

The jet tube is sized to an outside diameter smaller than the internal diameter of the drain fitting 29 of the tank 22. A rubber outlet adaptor 80 is fastened to the suction pipe 65 by a clamp 81 and has an outwardly flared skirt 82 that fits over the drain outlet fitting 29 and provides a liquid tight seal, as shown in FIGURE 3.

As shown in FIGURES 3, 4, and 9, a bracket 85 is formed with opposing parallel sides 86 and 87 having inturned forward ends 88 and 89 welded to the rearward end of the suction pipe 65. The legs 86 and 87 are joined together by a cross plate 90 that has an internally threaded boss 91 formed in its center.

A bushing 92 has a threaded nose 93 that is threaded into the internally threaded boss 91 in the bracket 85. A metal valve sleeve 94 is fastened to the bushing 92 by a plurality of screws 95. An end plate 96 is fitted within and welded to the rearward end of the valve sleeve 94. The end plate 96 has a central opening 97 through it.

A valve member 98 includes a valve stem 99 that is slidable through the bushing 92. The valve stem 99 has a liquid passage 100 through it and has an externally threaded forward end 101 and an externally threaded rearward end 102 of reduced diameter.

A valve head support 105 has an internally threaded recess 106 that enables it to be threaded onto the forward end 101 of the valve stem 99. The valve head support 105 has a forwardly extending hub 107 onto which a non-metallic valve head 108 is attached. A movable flap 109 is cut in the center of the valve head 108.

There is a flow orifice recess 111 in the valve head support 105 communicating with the internally threaded recess 106, and a smaller diameter hole 112 extends through the front of the valve head support 105 and communicates with the flow orifice 111. A rubber flow control member 113 having a passage 114 through it is mounted in the recess 111. A plate 115 having a hole 116 through its center positions the flow control member 113. The flow control member 113 operates in a known manner to meter the flow of liquid through its passage 114 to maintain a steady flow rate. There is a pressure drop in the liquid passing through the flow control member 113, as is conventional.

A retainer ring 117 is mounted on the end 102 of the valve stem 98. A rubber or plastic cup member 118 is held on the wave stem 98 against the retainer ring 117 by a nut 119 threaded onto the end 102 of the valve stem 99. Even though the cup member slides, it maintains a liquid seal against the inner wall of the sleeve 94. A compression spring 120 bears against the cup member 118 and at its other end, is seated about a hub 121 on the bushing 92.

A hollow hose connector stem 124 is welded to the plate member 96 within the hole 97. There is an annular rib 125 about the hose connector stem 124 that cooperates with a metal clamp 126 to tightly connect the end of a flexible hose 127.

The hose 127 leads from the liquid outlet of a conventional automatic washer control 21, as shown in FIGURE 1. The washer control 21 has hot and cold water inlet hoses 132 and 133 and a detergent container 134 that can be removed for refilling. A cord 135 connects the washer control 130 to a source of electrical power, and another cord 136 supplies electrical power to the motor within the pump housing 33 of the washer 20. A dial 137 permits selection of the desired stages of the washing cycle. The washer control is not, of itself, a part of this invention.

*Operation*

To clean the tank 22, the cap 30 covering its drain fitting 29 is removed. Then the washer 20 is tilted slightly forwardly from the position shown in FIGURE 2 to enable introduction of the forward end of the jet spray tube 74 into the drain outlet fitting 29 until the drain outlet adaptor 80 is tightly pressed about the drain outlet fitting 29. Then, with the detergent container 134 filled with detergent, the dial 137 is set for the desired stages of cleaning, such as the sequence of "clear water fill," "clear water circulate," "clear water drain," "detergent water fill," "detergent water circulate," "detergent water drain," "clear water fill," "clear water circulate," and "clear water drain." For such a series of stages, the washer control 130 automatically initiates, times, and terminates each stage.

For the first stage of clear water fill, clear water passes through the hose 127 and into the passage 100 in the valve stem 98. As this water, which is supplied under pressure, is forced through the passage 114 in the flow control member, it is subjected to a pressure drop. With this pressure drop, there is a net pressure applied against the right side of the cup member 118, which is greater than the resistance of the spring 120, causing the valve member 98 to move quickly from the position illustrated in FIGURE 9 to the position illustrated in FIGURE 12 with the valve head 108 pressed tightly against the open end of the pipe 66. The continued flow of water easily pushes the flap 109 open and permits the water to enter the pipe 65, the flap 109 being provided to reduce the water velocity and cause the impeller housing 36 to fill and insure priming of the pump.

The motor driving impeller 35 does not operate during the fill stage, so the water simply passes through the pipe 65 to the drain fitting 29 into the tank 22.

The control 21 times the introduction of fill water until the proper amount of water is within the tank. The control then automatically starts the next stage, which is the clear water circulate stage, automatically supplying current to the motor within the housing 33 to rotate the impeller 35. The design of the impeller 35 is such that it draws water from the suction pipe 65 upwardly through the opening 70 and discharges the water into the jet spray tube 74. The control 21 continues to supply water through the hose 127 so that the pressure differential will keep the valve head 108 tightly sealed against the end of the suction pipe 65. Therefore, as the impeller 35 rotates, water from within the tank 22 is drawn through the suction pipe 65 and upwardly through the opening 70 by the impeller 35 and is discharged through the jet spray tube 74. The openings 79 in the end 78 of the jet spray tube 74 cause the water to be sprayed in different directions to contact all portions of the interior surfaces of the tank 22. This circulation of water continues for a period regulated by the control 21.

A drain stage follows the clear water circulating stage. For the drain stage, the control 21 automatically interrupts the supply of power to the motor which drives the impeller 35 and automatically interrupts supplying water through the hose 127. When water stops flowing through the hose 127 and through the passage 114 in the flow control member 113, there is no longer a pressure drop or a pressure differential to hold the valve head 108 against the pipe 65. Therefore, the spring 120 forces the valve member back to the position illustrated in FIGURE 9 unblocking the pipe 65, and permitting water to flow from the tank 22 through the pipe 65 to be discharged onto the floor below the washer 20, to pass to a suitable floor drain (not shown).

When sufficient time has passed for the water to drain from the tank 22, the control 21 initiates the detergent water fill stage. For this stage, the control 21 automatically mixes detergent from the container 134 with water supplied to the hose 127. This detergent water passes through the flow control member 113, and the resulting pressure differential again closes the valve head 108 against the pipe 65. Filling then takes place as before described, except that at this time, the tank is partially filled with detergent and water.

The remaining cycles of circulating detergent water to clean the tank and then draining the detergent water, followed by rinsing through the stages of partially filling the tank with clear water, circulating the clear water, and draining the clear water, will now be clearly understandable from the foregoing description. When the tank is washed, the handle 62 is grasped to withdraw the jet spray tube from the tank 22, and the cap 30 is replaced.

It will be noted that this washer readily accommodates tanks having drain outlet fittings at different heights. For this, the legs 60 and 61 are easily adjustable upon loosening the bolts 64.

FIGURES 17, 18, and 19 show a modification of the invention which substitutes a manually operable valve 150 for the automatic valve 98 and which eliminates the washer control 21. Other parts of the tank washer are the same as previously described, including the suction pipe 65 and the bracket 85, as the consistent use of reference characters indicates.

For the valve 150, a guide 151 of nylon or other nonmetallic material is threaded into the boss 91 in the end 90 of the bracket 85. The guide 151 has a passage 152 through its center through which a valve stem 153 is slidable. A manually operable handle 154 is fixed to the outer end of the stem 153.

The inner end of the valve stem 153 has an internally threaded recess 156 into which the threaded end 157 of a stud 158 is threaded and can rotate. A washer 159 is welded to the valve stem 153 and acts as a stop for an outer plate 160 that is mounted on the valve stem. Another plate 161 is welded to the unthreaded end of the stud 158.

A rubber valve plug 163 is mounted on the valve stem 153 and is positioned between the plates 160 and 161. The valve plug 163 has a cylindrical body 164, the forward end 165 of which bears against the plate 161, and has a radially outwardly extending shoulder 166 that is positioned against the other plate 160 and is of larger diameter than the internal diameter of the suction pipe 65. The interior 167 of the valve plug 163 is hollow to provide flexibility.

The operation of the valve 150 is very easy. The valve is shown in the open position in FIGURE 18. To close the pipe 65, the handle 154 is grasped and pushed to introduce the valve plug 163 into the pipe 65. Then, the handle 154 is rotated as the shoulder 166 is held in contact with the end of the pipe 65 by the application of slight pressure against the handle 154. Rotation of the handle 154 in a clockwise direction threads the stud 158 further into the recess 156, drawing the plate 161 toward the plate 160. This squeezes the plug 163 between the reduced space between the plates 160 and 161, causing the side wall 164 of the plug 163 to expand outwardly and press tightly against the inner wall of the pipe 66.

To open the valve, the handle 154 is turned in the opposite direction, or counter-clockwise. This drives the stud 158 part of the way from the recess 156 to increase the distance between the plates 160 and 161, allowing the side wall 164 of the plug 163 to retract radially inwardly. Then, the now loosely fitting plug 163 can be withdrawn by pulling on the handle 154.

The washer which includes this manually operable valve is operated differently from the washer previously described. With the valve in the closed position shown in FIGURE 19, clear rinse water or detergent water is introduced into the tank 22 through an access opening beneath an access cover 31. When the proper amount of water or detergent water is in the tank, the pump within the pump housing 33 is energized to rotate the impeller 35 to circulate the water. The water circulates as before described, being drawn through the suction pipe 65 past the impeller 35 and discharged through the jet spray tube 74 to be sprayed against the interior walls of the tank. To drain the tank, the valve 150 is simply moved to the open position illustrated in FIGURE 18, thereby freeing the end of the suction pipe 65 and permitting the liquid to drain from the tank.

The washer with the manually operable valve 150, while less convenient than the automatically operable washer previously described, is still easy to operate and efficient in cleaning the tank. Also, it can be made less expensively.

Various changes and modifications may be made within the purview of this invention as will be readily apparent to those skilled in the art. Such changes and modifications are within the scope and teaching of this invention as defined by the claims appended hereto.

What is claimed is:

1. A tank washer comprising an impeller housing, an impeller rotatable within the impeller housing, an inlet to the impeller housing, an outlet from the impeller housing for receiving water drawn by the impeller through the inlet and discharged through the outlet, a jet spray tube connected to the impeller outlet and adapted to be extended through the drain outlet of a tank, the jet spray tube having a plurality of openings through it, a suction pipe having a passage through it, one end of the passage communicating with the drain fitting and the other end communicating with the inlet to the impeller housing, liquid conveyor means adapted to be connected to an external source of liquid, and means responsive to the flow of liquid through the liquid conveyor means for alternately connecting and disconnecting the liquid conveyor means to the suction pipe, the suction pipe having a drain opening for permitting liquid to drain from the tank when the liquid conveyor means is disconnected from the suction pipe.

2. The combination of claim 1 wherein the last-named means comprises a movable valve member having a passage through it, the valve member having a valve head for moving against an opening in the suction pipe to connect the conveyor means to the suction pipe and for moving away from the opening in the suction pipe to disconnect the conveyor means to the suction pipe, the valve member having a liquid passage through it in constant communication with the liquid conveyor means.

3. A tank washer comprising tube means defining a liquid passage, the tube means having first and second open ends, means for connecting the first end of the tube means to an opening in the tank, a valve member having a valve head, means for supporting the valve member for movement toward and away from the second end of the tube means to move the valve head into and out of liquid sealing contact with the second end of the tube means, the valve member and valve head having a liquid passage through them, a tube connected to a source of liquid, the liquid passage in the valve means being in constant communication with the tube, means biasing the valve member away from the tube means, and means to cause a pressure drop in liquid flowing through the liquid passage to establish a net pressure greater than the equivalent pressure of the spring to move the valve member toward the tube means when liquid flows through the liquid passage.

4. The tank washer of claim 3 including a jet spray tube adapted to extend into the tank, and an impeller for circulating water from the tube means to the jet spray tube, the jet spray tube having openings for spraying the circulated water against the interior walls of the tank.

5. The tank washer of claim 4 wherein the jet spray tube extends through at least a portion of the tube means and through the first end of the tube means and into the tank.

6. The tank washer of claim 5 wherein the opening in the tank comprises the drain opening and is defined by an outwardly projecting annular sleeve, and a resilient adaptor connected to the tube means adjacent the first end thereof, the adaptor having an annular skirt for fitting over the annular sleeve in liquid-tight contact.

7. The tank washer of claim 6 wherein all the parts of the washer are supported upon legs, and means for adjusting the height of the legs to accommodate different heights of drain openings.

8. A washer for a tank of the kind having a drain outlet, the washer comprising an impeller housing, an impeller rotatable within the impeller housing, an inlet to the impeller housing, an outlet from the impeller housing for receiving water drawn by the impeller through the inlet and discharged through the outlet, a suction pipe having a passage through it connected to the impeller inlet, means to releasably connect one end of the suction pipe to the drain outlet of the tank, a spray tube connected to the impeller outlet and extending through the end of the suction pipe connectable to the drain outlet of the tank, the spray tube extending beyond the suction pipe and into the tank when the said end of the suction pipe is connected to the drain outlet, the other end of the suction pipe being open, means to rotate the impeller to circulate liquid serially from the tank through the suction pipe, the impeller, and the spray tube, and valve means for alternately blocking and unblocking the said other end of the suction pipe.

9. The washer of claim 8 wherein the valve means comprises a manually operable valve including an expandable member insertable into the suction pipe and manually operable means to expand the expandable member against the inner walls of the suction pipe to block liquid flow.

References Cited

UNITED STATES PATENTS

| 3,121,536 | 2/1964 | McKibben | 134—168 XR |
| 3,236,248 | 2/1966 | Ray | 134—168 XR |

FOREIGN PATENTS

| 19,548 | 8/1894 | Great Britain. |

ROBERT L. BLEUTGE, *Primary Examiner.*